UNITED STATES PATENT OFFICE.

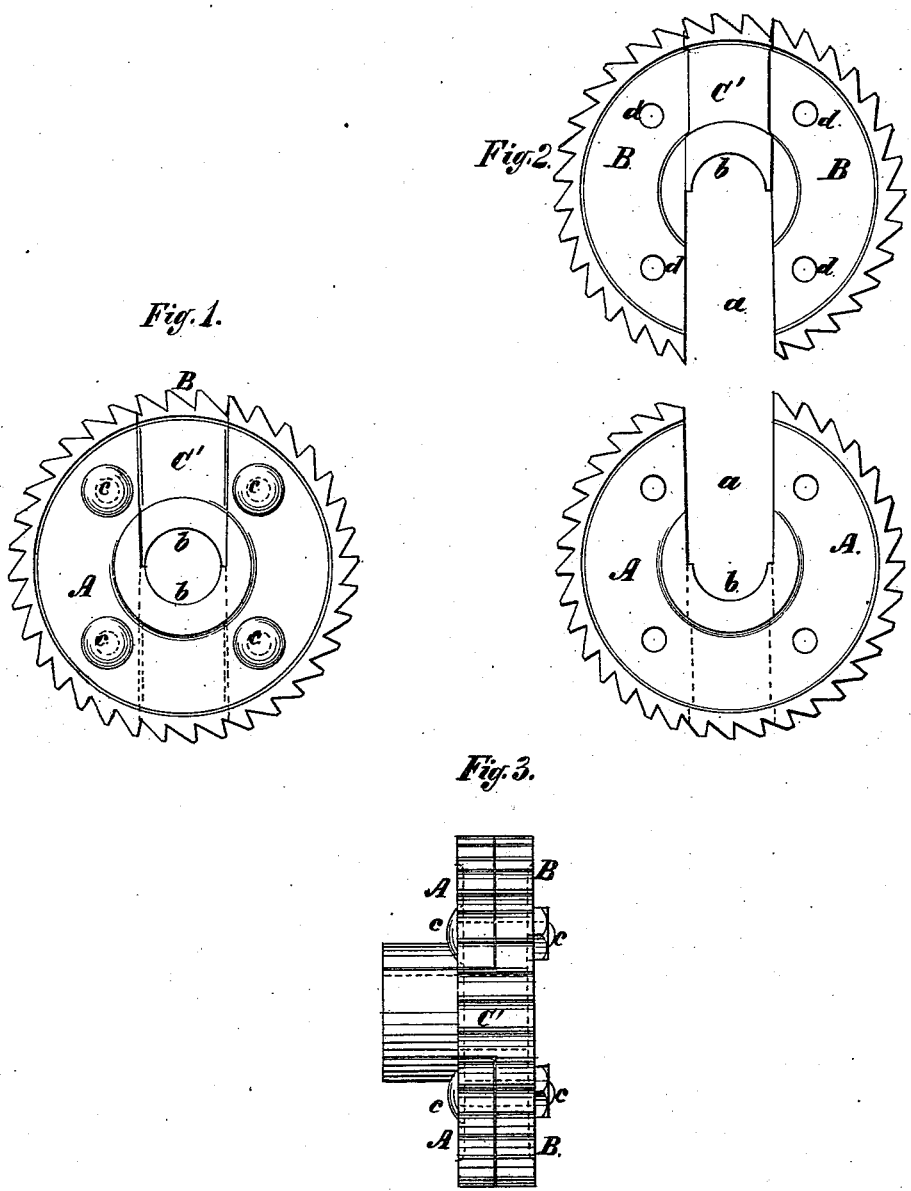

VINCENT THORPE, OF FALL RIVER, MASSACHUSETTS.

IMPROVEMENT IN DIVIDED WHEELS.

Specification forming part of Letters Patent No. 208,439, dated September 24, 1878; application filed February 19, 1878.

*To all whom it may concern:*

Be it known that I, VINCENT THORPE, of Fall River, in the county of Bristol and State of Massachusetts, have invented an Improvement in Divided Wheels, of which the following is a specification:

This invention belongs to that class of pulleys designed to be applied to shafting without removing the latter from its bearings, and commonly termed "divided pulleys" or "split wheels."

As hitherto constructed such pulleys have been liable to become loose or misplaced upon the shafting from the varied and complex strain exerted by the belt or band.

My invention is designed to obviate this difficulty; and to this end my said invention consists in a split or divided pulley composed of two radially-slotted lateral halves or sections, each half or section being provided with a radially-projecting part, which, when the pulley is applied to the shafting, fits into the radial slot of the other half or section, so that the two halves or sections being bolted each to the other, they together form a practically solid pulley, capable equally at all portions of its circumference of resisting the strain exerted thereupon during the use or operation of the pulley.

Figure 1 is a side view of a pulley made according to my invention. Fig. 2 is a side view, showing the two lateral halves or sections thereof separated from each other; and Fig. 3 is an edge view of the pulley as seen from the top of Figs. 1 and 2.

A and B are the two lateral halves or sections of the pulley, each being constructed with a radial slot, *a*, extending from the bore *b* of the pulley to its circumference, as represented more fully in Fig. 2. The width of these slots is preferably somewhat greater than the diameter of the bore *b*.

The slot *a* in one of the sections is diametrically opposite that in the other, as shown in Fig. 2. Each section has at one side a laterally-projecting part, C', extending from the bore *b* to the circumference of the section and diametrically opposite the slot *a* in the latter.

In applying the pulley to the shafting the slots *a* permit the two sections to straddle the shafting from opposite directions until the shafting is brought into the bore *b*, the laterally-projecting part C' of one section fitting into the slot *a* of the other section, thereby giving a continuous circumference to the pulley formed by the joining of the two sections, as described, and effectually interlocking them for rotary motion. The two sections are then firmly bolted together by bolts *c*, passing through coincident holes *d* suitably provided in the two sections.

By this means is provided a pulley or wheel of the class referred to, practically solid in structure, and capable of withstanding any strain, twist, or torsion that may be exerted upon it when in use.

It is furthermore to be particularly observed that I have herein used mainly the term "pulley," yet my invention is equally applicable to "gear-wheels" of almost every kind and character.

I am aware that split wheels or ratchets have been made with dovetail radial removable sections fitted into correspondingly-shaped radial slots in the bodies of the wheels; also, that such radial sections have been sometimes made with lateral curved flanges fitted into recesses provided in the bodies of the wheels; but wheels made in this manner are difficult to manufacture and to adjust to use, owing to the skill and care required in fitting the dovetails and in snugly applying the flanges in the recesses formed to secure them; and they are moreover inconvenient in their application to shafting, inasmuch as the removable section must be slipped into place by moving it parallel with the shaft—a thing difficult to accomplish when the dovetail joint is snug enough to insure steadiness to the wheel when affixed in position. Such I do not claim, the principal object of my invention herein set forth being to overcome and avoid the difficulties and drawbacks just referred to; but What I do claim as my invention is—

The combination of the two lateral sections A and B, each having the same circumference as the completed wheel, and each having a radial slot and a radially-projecting part, C', in combination with the bolts *c*, the radial slots and the parts C' being constructed to permit the two sections to be brought together by moving them radially inward upon each other, substantially as and for the purpose herein set forth.

VINCENT THORPE.

Witnesses:
    F. T. HATHAWAY,
    WILLIAM BOTTOMLEY.